United States Patent
Kono et al.

(10) Patent No.: US 8,913,806 B2
(45) Date of Patent: Dec. 16, 2014

(54) TEXTURE HOMOGENEITY BASED IN-VIVO IMAGE IDENTIFYING DEVICE, METHOD, AND COMPUTER-READABLE RECORDING DEVICE

(75) Inventors: Takashi Kono, Tackikawa (JP); Yamato Kanda, Hino (JP); Makoto Kitamura, Hachioji (JP); Masashi Hirota, Hachioji (JP)

(73) Assignee: Olympus Corporation, Tokyo (JP)

( * ) Notice: Subject to any disclaimer, the term of this patent is extended or adjusted under 35 U.S.C. 154(b) by 369 days.

(21) Appl. No.: 13/303,367

(22) Filed: Nov. 23, 2011

(65) Prior Publication Data

US 2012/0134556 A1 May 31, 2012

(30) Foreign Application Priority Data

Nov. 29, 2010 (JP) .................... 2010-265795

(51) Int. Cl.
| | | |
|---|---|---|
| G06K 9/00 | (2006.01) | |
| G06K 9/46 | (2006.01) | |
| G06K 9/50 | (2006.01) | |
| G06K 9/62 | (2006.01) | |
| G06T 7/40 | (2006.01) | |
| G06T 7/00 | (2006.01) | |

(52) U.S. Cl.
CPC .............. *G06T 7/401* (2013.01); *G06T 7/0012* (2013.01); *G06T 2207/10024* (2013.01); *G06T 2207/10068* (2013.01); *G06T 2207/20021* (2013.01); *G06T 2207/30028* (2013.01)
USPC ............ 382/128; 382/133; 382/201; 382/225

(58) Field of Classification Search
CPC ........... G06T 2207/30028–2207/30032; G06T 2207/10068; G06T 7/0012; G06T 7/401; G06T 7/402; G06T 7/403; G06T 7/404; G06T 7/405; G06T 7/406; G06T 7/407; G06K 9/6272
See application file for complete search history.

(56) References Cited

U.S. PATENT DOCUMENTS

| 7,623,690 B2 * | 11/2009 | Cahill et al. ................... 382/128 |
| 2007/0236491 A1 * | 10/2007 | Hundley et al. ............... 345/418 |
| 2010/0142775 A1 * | 6/2010 | Ganeshan et al. ............ 382/128 |

FOREIGN PATENT DOCUMENTS

| EP | 1 870 020 A1 | 12/2007 |
| JP | 2001-155019 A | 6/2001 |
| JP | 2006-218138 A | 8/2006 |
| JP | 2006-288878 A | 10/2006 |
| JP | 2006-320585 A | 11/2006 |
| JP | 2010-115413 A | 5/2010 |

OTHER PUBLICATIONS

Jin, H. "Extraction of Microcalcifications from Mammograms Using Morphological Filter with Multiple Structuring Elements", Systems & Computers in Japan, vol. 24, No. 11, Jan. 1, 1993, pp. 66-74.

(Continued)

*Primary Examiner* — Stephen R Koziol
*Assistant Examiner* — Timothy Choi
(74) *Attorney, Agent, or Firm* — Scully, Scott, Murphy & Presser, P.C.

(57) ABSTRACT

An image identifying device includes a mechanism that sets an evaluation area whose category is to be identified in an in-vivo image; a mechanism that acquires texture components from the evaluation area in the in-vivo image; a mechanism that calculates an evaluation value indicating homogeneity of the texture components; and a mechanism that identifies the category of the evaluation area on the basis of the evaluation value.

18 Claims, 19 Drawing Sheets

(56) References Cited

OTHER PUBLICATIONS

Da Silva Sousa, J.R.F., et al. "Methodology for Automatic Detection of Lung Nodules in Computerized Tomography Images" Computer Methods and Programs in Biomedicine, vol. 98, No. 1, Apr. 1, 2010, pp. 1-14.

Haralick, R.M., et al., "Textual Features for Image Classification", IEEE Transactions on Systems, Man, and Cybernetics, vol. 3, No. 6, Nov. 1, 1973, pp. 610-621.

European Search Report dated Feb. 22, 2013 from corresponding European Patent Application No. 11 00 9363.0.

Japanese Official Action dated Apr. 8, 2014 received in related application JP 2010-265795.

* cited by examiner

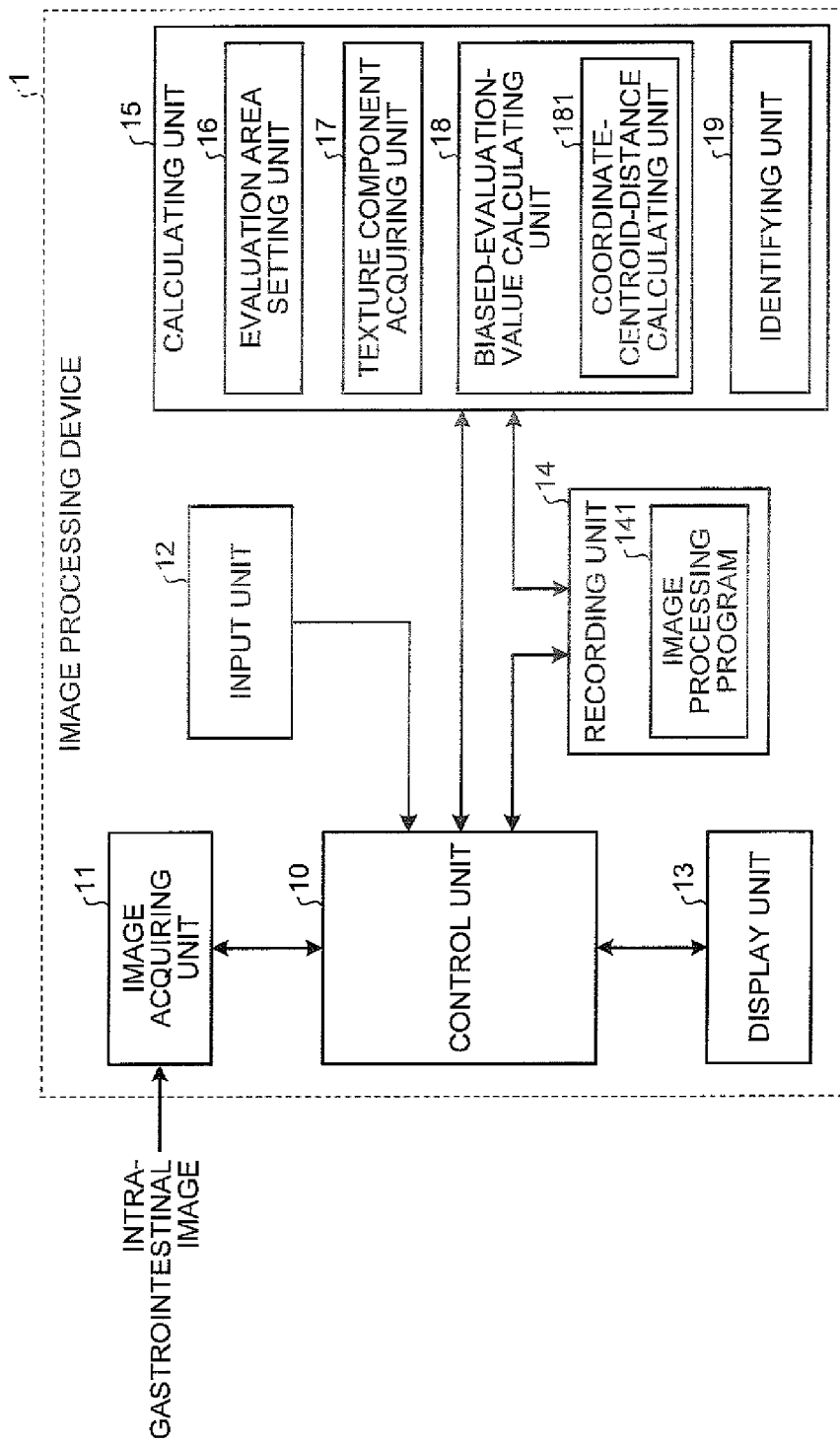

FIG.4
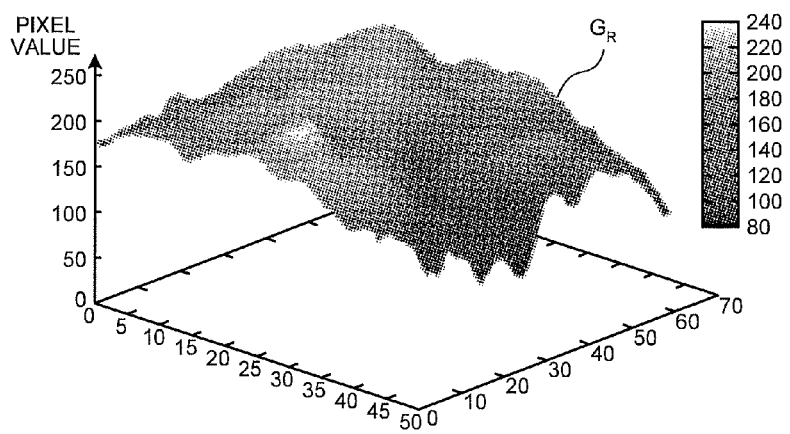
FIG.4A
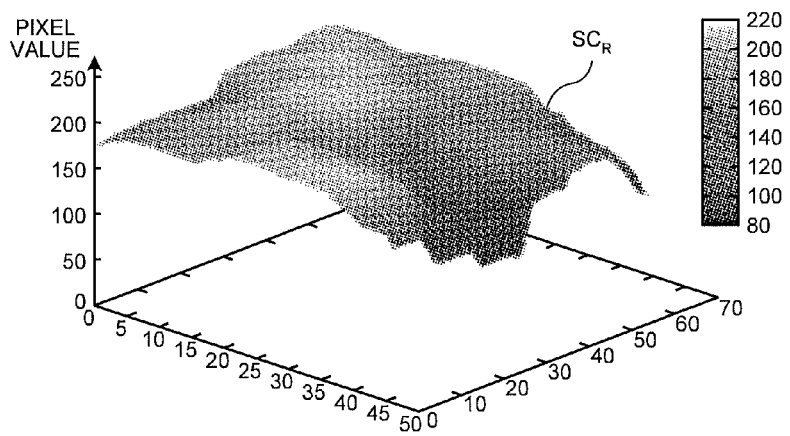
FIG.4B
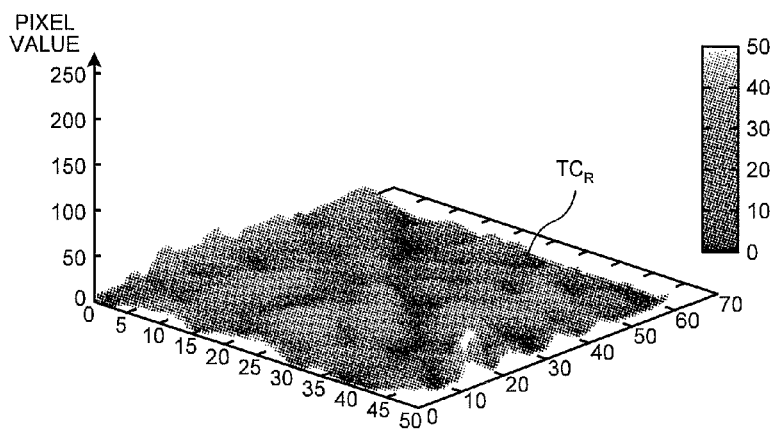
FIG.4C

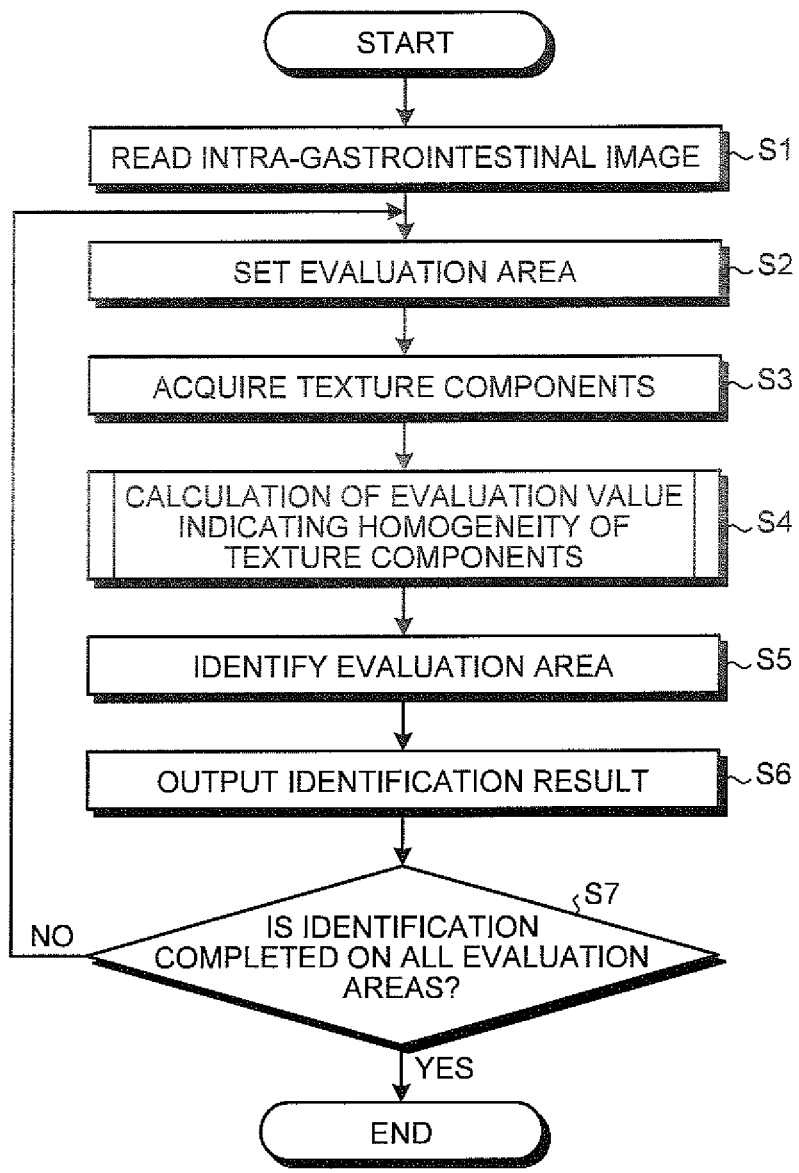

TEXTURE HOMOGENEITY BASED IN-VIVO IMAGE IDENTIFYING DEVICE, METHOD, AND COMPUTER-READABLE RECORDING DEVICE

CROSS-REFERENCE TO RELATED APPLICATIONS

This application is based upon and claims the benefit of priority from Japanese Patent Application No. 2010-265795, filed on Nov. 29, 2010, the entire contents of which are incorporated herein by reference.

BACKGROUND OF THE INVENTION

1. Field of the Invention

The present invention relates to an image processing device, an image processing method, and a computer-readable recording device for processing in-vivo images captured inside a body of a subject.

2. Description of the Related Art

Conventionally, endoscopes are widely used as a medical observation device that is introduced into the body of a subject, such as a patient, to observe the inside of a lumen. In recent years, swallowable endoscopes (capsule endoscopes) have been developed that are provided with an imaging device, a communication device, and the like in a capsule-shaped casing and that wirelessly transmit image data captured by the imaging device to the outside of the body. The number of in-vivo images (intra-gastrointestinal images) sequentially captured by such a medical observation device is huge (more than several tens of thousands), and considerable experience is required to make observation and diagnosis of each intra-gastrointestinal image. Therefore, there is a demand for a medical diagnosis support function for supporting doctors in the diagnosis. As one of image recognition techniques that realize such a function, a technique has been proposed in which an abnormal area, such as a lesion, is automatically detected from an intra-gastrointestinal image and an image that needs to be focused on in the diagnosis is presented.

Meanwhile, intra-gastrointestinal images sometimes contain contents, such as residue, that need not be observed, in addition to a mucosal area to be observed in the diagnosis. As a technique for distinguishing between the mucosal area and the contents area (i.e., categories of areas), for example, Japanese Laid-open Patent Publication No. 2010-115413 discloses an image processing method, in which a plurality of images are selected from a series of intra-gastrointestinal images, color feature data is calculated for each pixel or for each small area of the selected images, and a mucosal area in each of the images constituting the series of the intra-gastrointestinal images is identified on the basis of the color feature data.

Furthermore, as a technique for distinguishing between different areas that appear in an image, a method based on texture feature data using a co-occurrence matrix is known (see, for example, Okutomi Masatoshi et al., "Digital Image Processing", CG-ARTS Society, pp. 194 to 195). The co-occurrence matrix is a matrix whose elements are the probabilities $P_\delta(L_i, L_j)$ that pairs of pixel values $(L_i, L_j)$ occur on the assumption that Li and Lj represent respective pixel values of a pixel i and a pixel j that is deviated from the pixel i by predetermined displacement $\delta(d, \theta)$ (d is a distance and $\theta$ is an angle). With use of such a matrix, it is possible to obtain the feature data indicating the properties, such as homogeneity, directionality, or contrast, of the pixel values.

SUMMARY OF THE INVENTION

An image processing device according to an aspect of the present invention includes: an evaluation area setting unit that sets an evaluation area whose category is to be identified in an in-vivo image; a texture component acquiring unit that acquires texture components from the evaluation area in the in-vivo image; an evaluation value calculating unit that calculates an evaluation value indicating homogeneity of the texture components; and an identifying unit that identifies the category of the evaluation area on the basis of the evaluation value.

An image processing method according to another aspect of the present invention includes: setting an evaluation area whose category is to be identified in an in-vivo image; acquiring texture components from the evaluation area in the in-vivo image; calculating an evaluation value indicating homogeneity of the texture components; and identifying the category of the evaluation area on the basis of the evaluation value.

A computer-readable recording device according to still another aspect of the present invention is stored thereon an executable program, wherein the program instructs a processor to perform: setting an evaluation area whose category is to be identified in an in-vivo image; acquiring texture components from the evaluation area in the in-vivo image; calculating an evaluation value indicating homogeneity of the texture components; and identifying the category of the evaluation area on the basis of the evaluation value.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram of a configuration of an image processing device according to a first embodiment of the present invention;

FIGS. 4A to 4C are diagrams illustrating a simulation result of the texture-component acquisition process performed on an evaluation area mostly composed of a residue area;

FIG. 5 is a flowchart of an operation performed by the image processing device illustrated in FIG. 1;

DETAILED DESCRIPTION OF THE PREFERRED EMBODIMENTS

Figure 2A:
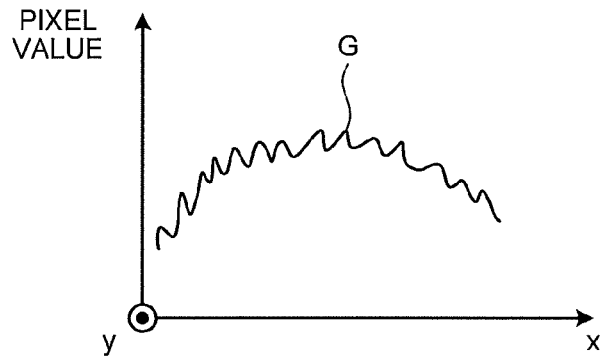
FIGS. 2A to 2C are diagrams explaining a method of acquiring texture components through a morphological opening process.

Exemplary embodiments of the present invention will be explained in detail below with reference to the accompanying drawings. The present invention is not limited by the embodiments. In the drawings, the same components are denoted by the same reference numerals.

Image processing devices according to the embodiments described below are apparatuses that process in-vivo images (intra-gastrointestinal images) of a subject captured by a medical observation device, such as an endoscope or a capsule endoscope. Specifically, the image processing devices perform a process for identifying categories of areas that appear in the intra-gastrointestinal images (i.e., identification of a mucosal area that is observed in diagnosis and a residue area that need not be observed in the diagnosis). In the following embodiments, the intra-gastrointestinal images captured by the medical observation device are, for example, color images, in which each pixel has pixel levels (pixel values) corresponding to respective color components of R (red), G (green), and B (blue).

First Embodiment

FIG. 1 is a block diagram of a configuration of an image processing device according to a first embodiment of the present invention. As illustrated in FIG. 1, an image processing device 1 includes an image acquiring unit 11, an input unit 12, a display unit 13, a recording unit 14, a calculating unit 15, and a control unit 10 that controls the whole operation of the image processing device 1.

The image acquiring unit 11 acquires image data of intra-gastrointestinal images captured by a medical observation device. The image acquiring unit 11 is appropriately configured depending on the mode of a system that includes the medical observation device. For example, when the medical observation device is a capsule endoscope and a portable recording medium is used to transmit and receive the image data to and from the medical observation device, the image acquiring unit 11 is realized by a reader device that reads the image data of the intra-gastrointestinal images stored in the recording medium that is detachably attached thereto. When a server for storing the image data of the intra-gastrointestinal images captured by the medical observation device is provided, the image acquiring unit 11 is realized by a communication device or the like that is connected to the server and that acquires the image data of the intra-gastrointestinal images through data communication with the server. Alternatively, the image acquiring unit 11 may be configured as an interface device or the like that receives image signals from the medical observation device, such as an endoscope, via a cable.

The input unit 12 is realized by an input device, such as a keyboard, a mouse, a touch panel, or various switches, and outputs input signals input through user operation of the input device to the control unit 10.

The display unit 13 is realized by a display device, such as an LCD or an EL display, and displays various screens including intra-gastrointestinal images under the control of the control unit 10.

The recording unit 14 is realized by various IC memories, such as a ROM configured by a rewritable flash memory or the like and a RAM, a hard disk that is built in or is connected through a data communication terminal, an information recording medium such as a CD-ROM, a reading device thereof, or the like. The recording unit 14 stores therein the image data of the intra-gastrointestinal images acquired by the image acquiring unit 11, a program for operating the image processing device 1 or for causing the image processing device 1 to implement various functions, data used during execution of the program, and the like. Specifically, the recording unit 14 stores therein an image processing program 141 for distinguishing between a mucosal area and a residue area contained in an intra-gastrointestinal image.

The calculating unit 15 is realized by hardware, such as a CPU, and the image processing program 141 loaded on the hardware. The calculating unit 15 performs various types of calculation processing for processing the image data of the intra-gastrointestinal images and distinguishing the mucosal area and the residue area. The calculating unit 15 includes an evaluation area setting unit 16, a texture component acquiring unit 17, a biased-evaluation-value calculating unit 18 as an evaluation value calculating means that calculates an evaluation value indicating the homogeneity of texture components in the evaluation area, and an identifying unit 19.

The evaluation area setting unit 16 sets an evaluation area, in which a mucosal area and a residue area are distinguished, from an intra-gastrointestinal image.

The texture component acquiring unit 17 acquires texture components by eliminating structural components from the evaluation area of the intra-gastrointestinal image. As a method of acquiring the texture components, for example, a morphological opening process is used (see KOBATAKE Hidefumi, "Morphology", Corona Publishing CO., LTD. pp. 82 to 85).

Figure 2B:
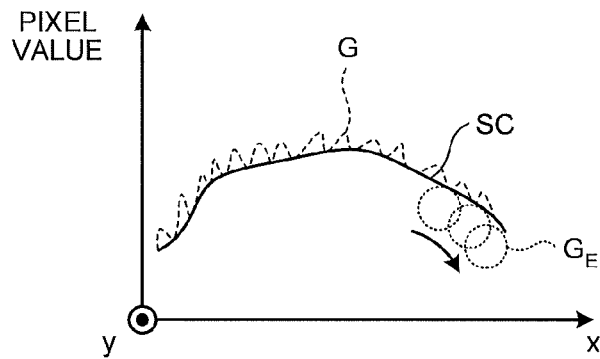
Figure 2C:
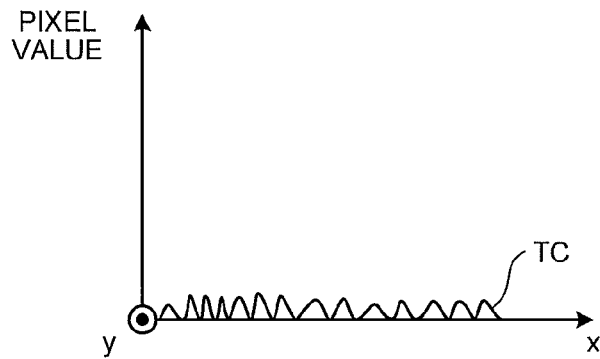

FIGS. 2A to 2C are diagrams explaining the method of acquiring the texture components through the morphological opening process. In the morphological opening process, a reference graphic $G_E$ called a structuring element is moved so as to be circumscribed around an image G (FIG. 2A) from the smallest pixel value in a three-dimensional space based on the assumption that the pixel value of each pixel on the xy plane constituting a two-dimensional image serves as the height (z axis), so that a locus SC of the maximum value of the outer circumference of the reference graphic $G_E$ is obtained (FIG. 2B). The locus SC corresponds to the structural components contained in the original image G. Then, the locus (structural components) SC is subtracted from the image G, so that texture components TC are obtained (FIG. 2C).

Figure 3A:
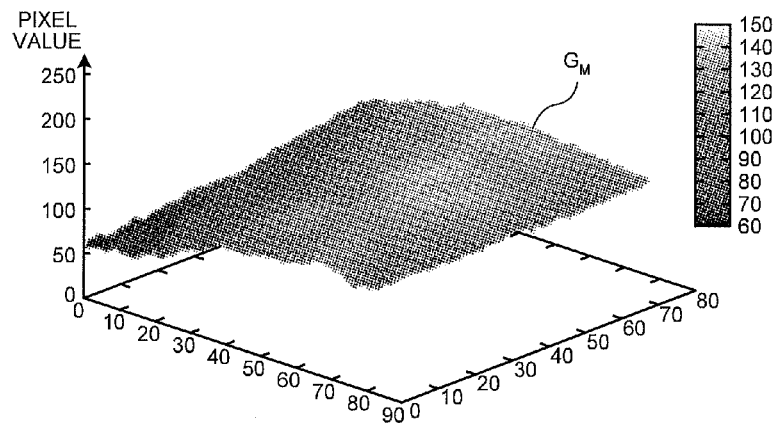
FIGS. 3A to 3C are diagrams illustrating a simulation result of a texture-component acquisition process performed on an evaluation area mostly composed of a mucosal area.
Figure 3B:
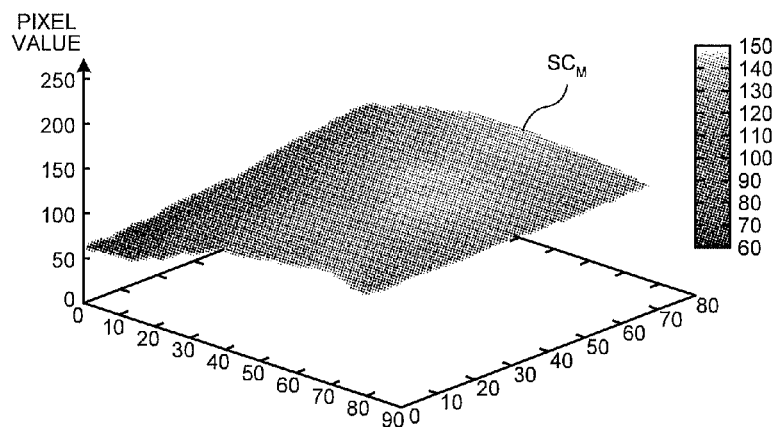
Figure 3C:
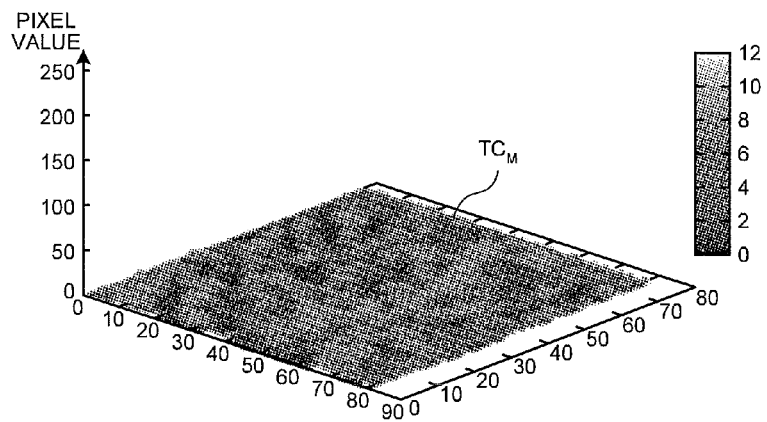

FIGS. 3A to 3C are diagrams illustrating a simulation result of acquisition of the texture components from a mucosal area. As illustrated in FIGS. 3A to 3C, structural components $SC_M$ (FIG. 3B) obtained through the opening process are subtracted from an image $G_M$ (FIG. 3A) of the mucosal area, so that texture components $TC_M$ of the mucosal area (FIG. 3C) are obtained. As illustrated in FIG. 3C, the texture components $TC_M$ of the mucosal area are relatively homogeneous.

By contrast, FIGS. 4A to 4C are diagrams illustrating a simulation result of acquisition of the texture components from a residue area. As illustrated in FIGS. 4A to 4C, structural components $SC_R$ (FIG. 4B) obtained through the opening process are subtracted from an image $G_R$ (FIG. 4A) of the residue area, so that texture components $TC_R$ of the residue area (FIG. 4C) are obtained. As illustrated in FIG. 4C, the texture components $TC_R$ of the residue area are not homogeneous but have a lot of irregularities.

As the method of acquiring the texture components, various known methods may be used other than the method described above. For example, the Fourier transform is performed on an intra-gastrointestinal image and then high-pass filter processing is performed to cut low-frequency components. Thereafter, the inverse Fourier transform is performed on the image thus obtained to obtain the texture components.

The biased-evaluation-value calculating unit 18 calculates an evaluation value that indicates the homogeneity of the texture components in the coordinate space. Specifically, the biased-evaluation-value calculating unit 18 includes a coordinate-centroid-distance calculating unit 181. The coordinate-centroid-distance calculating unit 181 calculates, as the evaluation value that indicates the homogeneity, a distance between a centroid of the coordinate and a weighted centroid of the coordinate that is weighted by pixel values (luminance) of the texture components.

The identifying unit 19 identifies a category of an evaluation area on the basis of the evaluation value calculated by the biased-evaluation-value calculating unit 18. Specifically, when the evaluation value indicates that the texture components are homogeneous, the identifying unit 19 identifies the evaluation area as the mucosal area (see FIG. 3C). On the other hand, when the evaluation value does not indicate that the texture components are homogeneous, the identifying unit 19 identifies the evaluation area as the residue area (see FIG. 4C). Whether the evaluation value indicates that the texture components are homogeneous or not is determined depending on whether the evaluation value is in a predetermined range.

The control unit 10 is realized by hardware, such as a CPU. The control unit 10 reads various programs stored in the recording unit 14 and transfers instructions or data to each unit included in the image processing device 1 on the basis of the image data input by the image acquiring unit 11 or an operational signal or the like input by the input unit 12, thereby controlling the overall operation of the image processing device 1.

Figure 6:
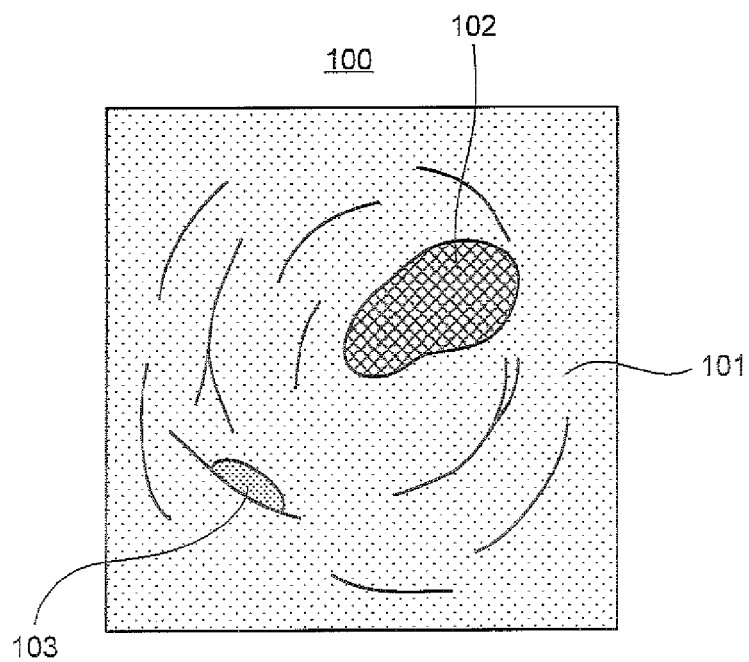
FIG. 6 is a schematic diagram illustrating an example of an intra-gastrointestinal image processed by the image processing device illustrated in FIG. 1.

The operation performed by the image processing device 1 will be explained below with reference to FIG. 5. FIG. 5 is a flowchart of an image processing operation for distinguishing between the mucosal area and the residue area, which is performed by the image processing device 1. In the following, an example will be explained in which image processing is performed on an intra-gastrointestinal image illustrated in FIG. 6. As illustrated in FIG. 6, a series of intra-gastrointestinal images including an intra-gastrointestinal image 100 mostly contains a mucosal area 101 and sometimes contains a residue area 102, a lesion area 103, or the like.

When image data of the series of the intra-gastrointestinal images acquired by the image processing device 1 are stored in the recording unit 14, the calculating unit 15 reads the intra-gastrointestinal image 100 as a processing object from the recording unit 14 (Step S1).

Figure 7:
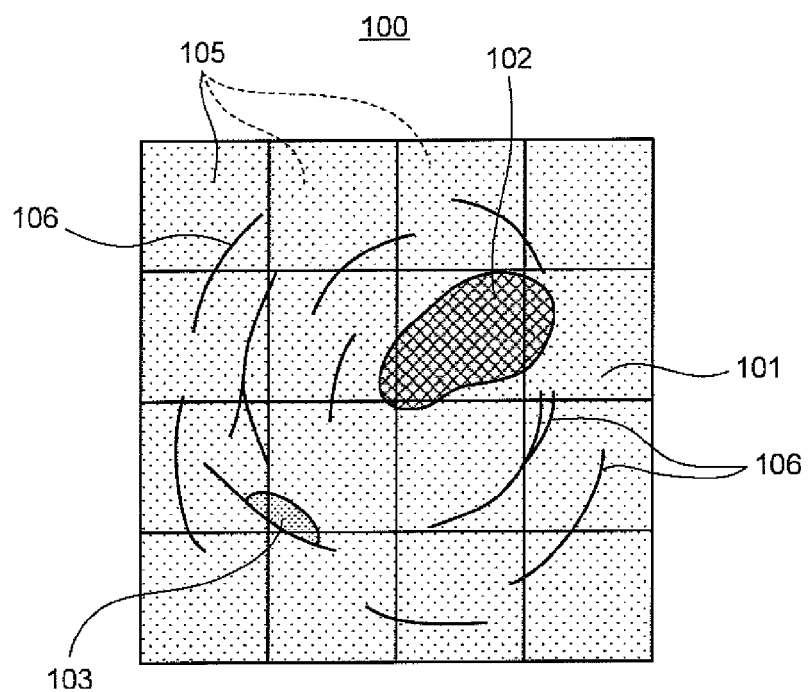
FIG. 7 is a schematic diagram illustrating an example an evaluation area set on the intra-gastrointestinal image.

At Step S2, the evaluation area setting unit 16 sets an evaluation area in the intra-gastrointestinal image 100. Specifically, the evaluation area setting unit 16 divides the intra-gastrointestinal image 100 into a plurality of rectangular areas as illustrated in FIG. 7, and sequentially sets the areas as an evaluation area 105. In FIG. 7, the intra-gastrointestinal image 100 is divided into sixteen areas; however, the number of the divided areas and the size and the shape of each area are not limited to this example and can be set as desired. For example, it is possible to set an area corresponding to one or a few pixels as one evaluation area, or it is possible to set the whole intra-gastrointestinal image 100 (i.e., without division) as one evaluation area.

At Step S3, the texture component acquiring unit 17 receives the intra-gastrointestinal image 100 and information (e.g., coordinate information) indicating the evaluation area 105, and removes structural components 106 from the intra-gastrointestinal image in the evaluation area 105, thereby acquiring texture components.

At Step S4, the coordinate-centroid-distance calculating unit 181 calculates, as the evaluation value that indicates the homogeneity of the texture components in the evaluation area 105 (hereinafter, also simply described as an "evaluation value"), a coordinate centroid distance that is a distance between a centroid of the coordinate in the evaluation area 105 and a weighted centroid of the coordinate that is weighted by pixel values of the texture components in the evaluation area 105.

Figure 8:
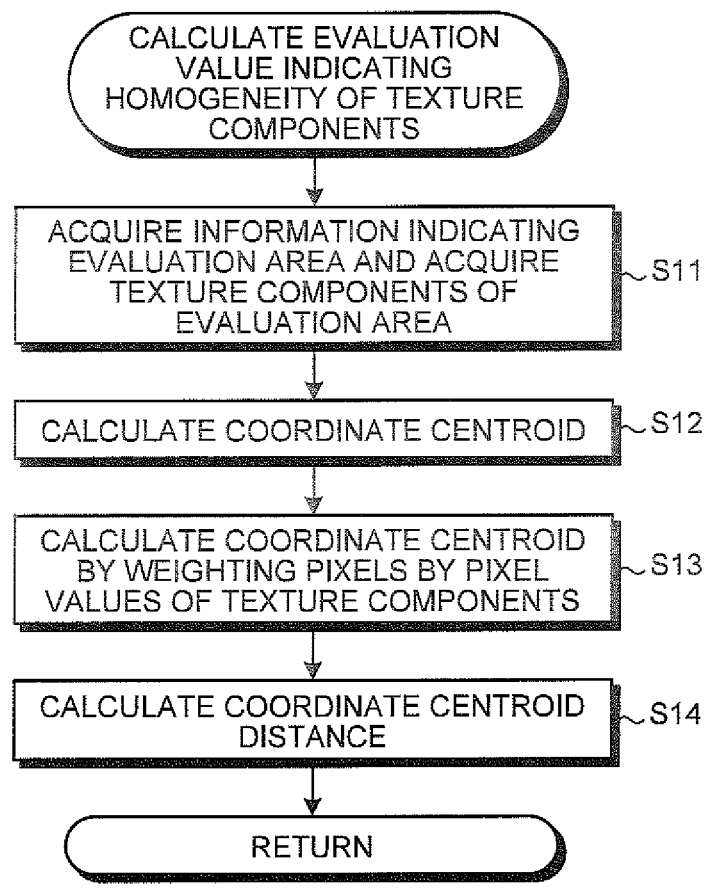
FIG. 8 is a flowchart of a process for calculating an evaluation value that indicates texture components.

FIG. 8 is a flowchart of a process for calculating the evaluation value that indicates the homogeneity of the texture components. At Step S11, the coordinate-centroid-distance calculating unit 181 acquires information (e.g., coordinate information) indicating the evaluation area 105 from the evaluation area setting unit 16 and acquires texture components of the evaluation area 105 from the texture component acquiring unit 17.

At Step S12, the coordinate-centroid-distance calculating unit 181 calculates a coordinate centroid ($g_x$, $g_y$) of pixels contained in the evaluation area 105 by using the following Equation (1).

$$\begin{cases} g_x = \dfrac{\sum\limits_{i(x,y)}^{N} Xi}{N} \\ g_y = \dfrac{\sum\limits_{i(x,y)}^{N} Yi}{N} \end{cases} \quad (1)$$

In Equation (1), Xi is the x coordinate of a pixel i (x, y) at the i-th position in the evaluation area 105, and Yi is the y coordinate of the pixel i (x, y) at the i-th position in the evaluation area 105. N is the total number of pixels contained in the evaluation area 105.

At Step S13, the coordinate-centroid-distance calculating unit 181 calculates a coordinate centroid ($G_x$, $G_y$) by weighting the pixels contained in the evaluation area 105 by pixel values of texture components, by using the following Equation (2).

$$\begin{cases} G_x = \dfrac{\sum\limits_{i(x,y)}^{N} XiTi}{\sum\limits_{i(x,y)}^{N} Ti} \\ G_y = \dfrac{\sum\limits_{i(x,y)}^{N} YiTi}{\sum\limits_{i(x,y)}^{N} Ti} \end{cases} \quad (2)$$

In Equation (2), Ti (x, y) is the pixel value of a texture component of the pixel at the i-th position in the evaluation area 105.

At Step S14, the coordinate centroid distance $D_{G\text{-}g}$ by using the calculation results obtained at Steps S12 and S13 and the following Equation (3).

$$D_{G\text{-}g} = \sqrt{(G_x - g_x)^2 + (G_y - g_y)^2} \quad (3)$$

Thereafter, the operation returns to the main routine.

When the texture components are homogeneous, the weighted coordinate centroid ($G_x$, $G_y$) approximately matches with the coordinate centroid ($g_x$, $g_y$), so that the value of the coordinate centroid distance $D_{G\text{-}g}$ becomes small. On the other hand, when the texture components are not homogeneous, the weighted coordinate centroid ($G_x$, $G_y$) is deviated from the coordinate centroid ($g_x$, $g_y$), so that the value of the coordinate centroid distance $D_{G\text{-}g}$ becomes large.

The coordinate-centroid-distance calculating unit 181 outputs the coordinate centroid distance $D_{G\text{-}g}$ calculated through the processes at Steps S11 to S14 described above to the identifying unit 19 as the evaluation value that indicates the homogeneity of the texture components.

At Step S5, the identifying unit 19 identifies the category of the evaluation area 105 by using the coordinate centroid distance $D_{G\text{-}g}$ calculated by the coordinate-centroid-distance calculating unit 181 as the evaluation value. Specifically, the identifying unit 19 compares the evaluation value with a predetermined threshold that is set in advance. When the evaluation value is smaller than the predetermined threshold, the identifying unit 19 determines that the texture components are homogeneous and identifies the evaluation area 105 as a mucosal area. On the other hand, when the evaluation value is equal to or greater than the predetermined threshold, the identifying unit 19 determines that the texture components are inhomogeneous and identifies the evaluation area 105 as a residue area. The identifying unit 19 outputs and displays the identification result of the evaluation area 105 on the display unit 13, and stores the identification result in the recording unit 14 (Step S6).

When there is the evaluation area 105 of which category is not identified (NO at Step S7), the operation returns to Step S2. On the other hand, when the identification process is completed on all of the evaluation areas 105 (YES at Step S7), the image processing operation on the intra-gastrointestinal image 100 ends.

As described above, according to the first embodiment, whether the evaluation area is identified as the mucosal area or the residue area is determined by focusing on the homogeneity of the texture components in the evaluation area. Therefore, it is possible to appropriately identify a category of an identification target area (evaluation area) whose size and shape may vary, by using an algorithm that operates at a high processing speed and without being influenced by imaging conditions. Furthermore, according to the first embodiment, the coordinate centroid distance is calculated as the evaluation value that indicates the homogeneity of the texture components. Therefore, it is possible to determine the homogeneity of the texture components by simple calculation processing.

First Modification of the First Embodiment

The evaluation area may be set (Step S2) by various methods other than the method described above. For example, it is possible to divide the intra-gastrointestinal image by color feature data (see Japanese Laid-open Patent Publication No. 2010-115413) and set each divided area as the evaluation area. Alternatively, it is possible to set an internal area of a closed curve that is extracted by an active contour method (snakes method), as one evaluation area. The active contour method is a method in which the shape of a closed curve that is given as an initial value is continuously changed to extract a closed curve that has the most stable energy level based on the continuity and the smoothness of the closed curve and based on the edge intensity on the closed curve (see CG-ARTS society, Digital Image Processing, pp. 197 to 199).

Second Modification of the First Embodiment

When the coordinate centroid weighted by the pixel values of the texture components is calculated (Step S13), it is possible to perform the weighting on only pixels that satisfy a predetermined condition instead of performing the weighting on all of the pixels by the pixel values. Specifically, the weighting is performed on a pixel whose pixel value is a predetermined percent or greater (e.g., 50% or greater) of the maximum pixel value in the evaluation area. Alternatively, it is possible to perform the weighting on only a pixel having a peak pixel value in the continuous distribution of the texture components (i.e., a pixel whose first derivative is zero and whose second derivative is negative). Consequently, when the texture components are inhomogeneous, distortion between the normal coordinate centroid ($g_x$, $g_y$) and the weighted coordinate centroid ($G_x$, $G_y$) is further increased, so that it becomes possible to more easily distinguish between the mucosal area and the residue area.

Second Embodiment

An image processing device according to a second embodiment of the present invention will be explained below.

Figure 9:
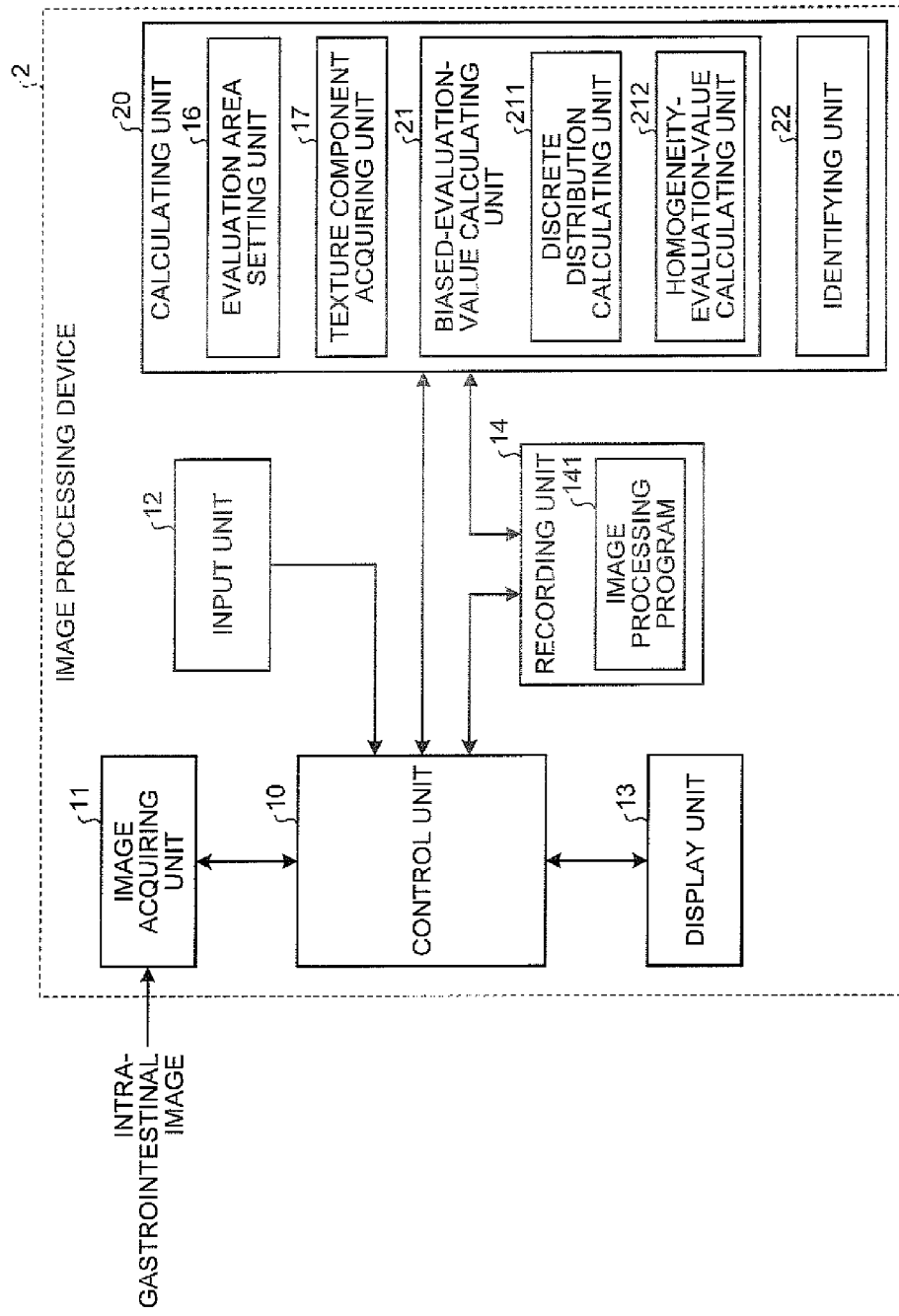
FIG. 9 is a block diagram of a configuration of an image processing device according to a second embodiment of the present invention.

FIG. 9 is a block diagram of a configuration of the image processing device according to the second embodiment. An image processing device 2 illustrated in FIG. 9 includes a calculating unit 20. The calculating unit 20 includes a biased-evaluation-value calculating unit 21 as the evaluation value calculating means, and an identifying unit 22 that identifies a category of an evaluation value on the basis of a calculation result obtained by the biased-evaluation-value calculating unit 21. The calculating unit 20 of the second embodiment converts the continuous distribution of the texture components in the evaluation area into a discrete distribution, and calculates the evaluation value indicating the homogeneity of the texture components on the basis of the discrete distribution. The other configurations are the same as those illustrated in FIG. 1.

The biased-evaluation-value calculating unit 21 includes a discrete distribution calculating unit 211 and a homogeneity-evaluation-value calculating unit 212. The discrete distribution calculating unit 211 generates discrete distribution data composed of a plurality of discrete points on the basis of the texture components represented as the continuous distribution. The homogeneity-evaluation-value calculating unit 212 calculates the evaluation value indicating the homogeneity of the texture components on the basis of the discrete distribution data. The identifying unit 22 determines the homogeneity of the texture components on the basis of the evaluation value and identifies the evaluation area as the mucosal area or the residue area on the basis of the determination result.

Figure 10:
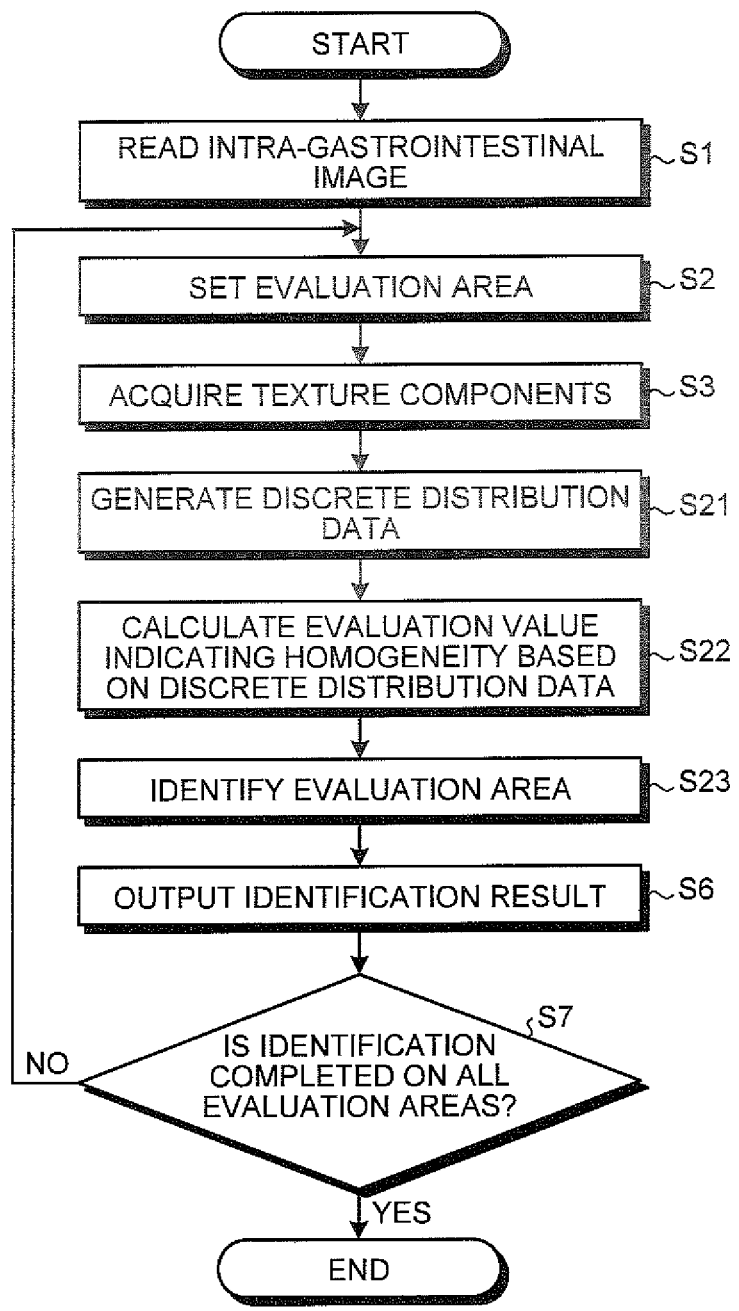
FIG. 10 is a flowchart of an operation performed by the image processing device illustrated in FIG. 9.
Figure 11:
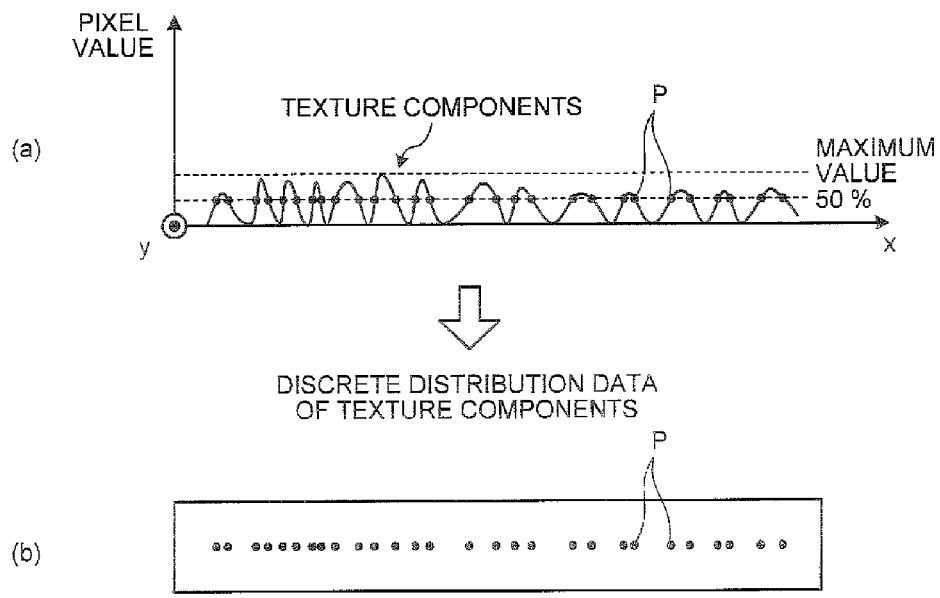
FIG. 11 is a diagram explaining a method of generating discrete distribution data from continuously-distributed texture components in a mucosal area.
Figure 12:
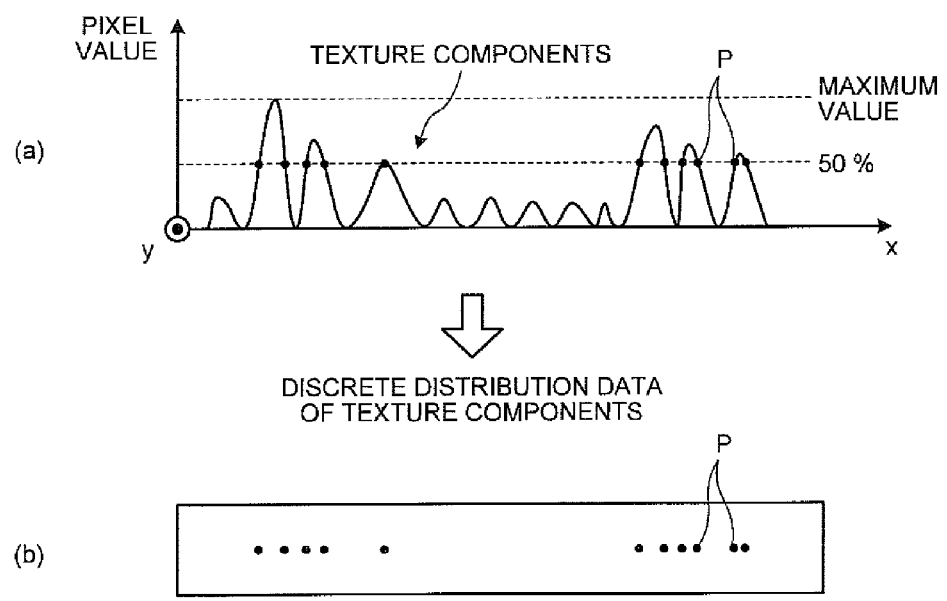
FIG. 12 is a diagram explaining a method of generating discrete distribution data from continuously-distributed texture components in a residue area.

The operation performed by the image processing device 2 will be explained below with reference to FIGS. 10 to 12. FIG. 10 is a flowchart of the operation performed by the image processing device 2. The operations at Steps S1 to S3, S6, and S7 are the same as those explained in the first embodiment.

At Step S21, the discrete distribution calculating unit 211 generates discrete distribution data from the texture components represented as the continuous distribution. FIG. 11 is a diagram explaining a process for generating discrete distribution data of the texture components contained in a mucosal area. FIG. 12 is a diagram explaining a process for generating discrete distribution data of the texture components contained in a residue area. Specifically, the discrete distribution calculating unit 211 receives information (coordinate information) indicating the evaluation area from the evaluation area setting unit 16, receives the texture components represented as the continuous distribution from the texture component acquiring unit 17, and acquires the maximum value of the pixel values in the evaluation area (FIG. 11(a) and FIG. 12(a)).

Subsequently, the discrete distribution calculating unit 211 acquires the value of a predetermined percent of the maximum value of the pixel values (hereinafter, described as a sampling value). In FIG. 11(a) and FIG. 12(a), the sampling value is set to, for example, 50% of the maximum value. Furthermore, the discrete distribution calculating unit 211 extracts pixels (coordinates) having the same pixel values as the sampling value, and generates discrete distribution data by setting these pixels as points (discrete points) constituting the discrete distribution (FIG. 11(b) and FIG. 12(b)).

At Step S22, the homogeneity-evaluation-value calculating unit 212 calculates the evaluation value indicating the homogeneity of the texture components, on the basis of the discrete distribution data generated by the discrete distribution calculating unit 211. At this time, the homogeneity-evaluation-value calculating unit 212 uses what is called a spatial analysis method. The spatial analysis method is a method for classifying the discrete distribution data into a "distribution type" or a "concentrated type". In the second embodiment, as an example of the spatial analysis method, the nearest neighbor distance method is explained, in which the distribution of the discrete points P is analyzed on the basis of distances between the discrete points P.

Figure 13:
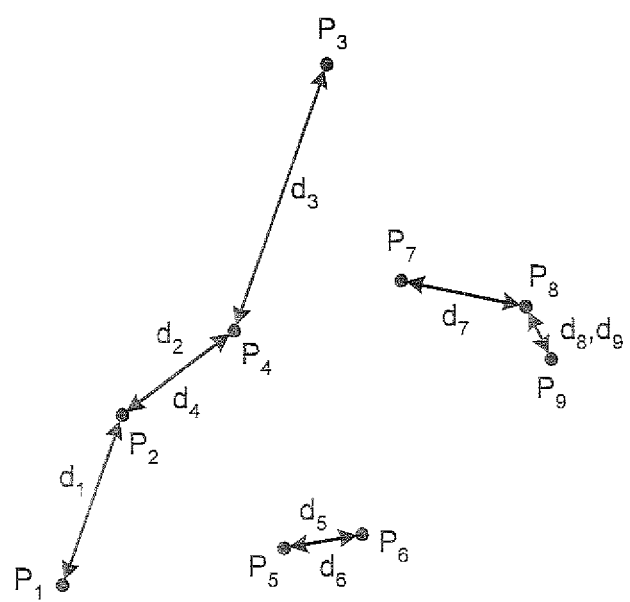
FIG. 13 is a diagram explaining a method of calculating an average nearest neighbor distance by the nearest neighbor distance method.

As illustrated in FIG. 13, a distance $d_i$ between each of the discrete points $P_i$ (i=1 to n) constituting the discrete distribution data and the nearest neighbor discrete point. Then, an average nearest neighbor distance W that is an average of the distances $d_i$ is calculated by using the following Equation (4).

$$W = \frac{1}{n}\sum_{i=1}^{n} d_i \qquad (4)$$

In Equation (4), n is the total number of the discrete points $P_i$ contained in the discrete distribution data. The average nearest neighbor distance W calculated as above is used as the evaluation value that indicates the homogeneity of the texture components.

Figure 14A:
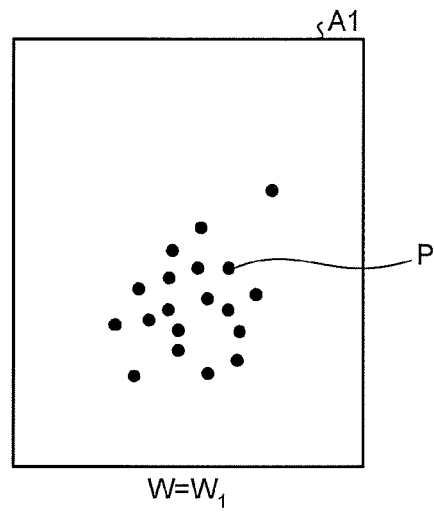
FIGS. 14A to 14C are diagrams illustrating a relationship between dispersion of discrete points and an evaluation value in an evaluation area.
Figure 14B:
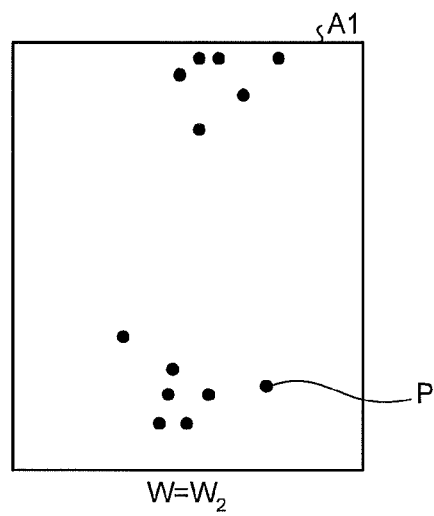
Figure 14C:
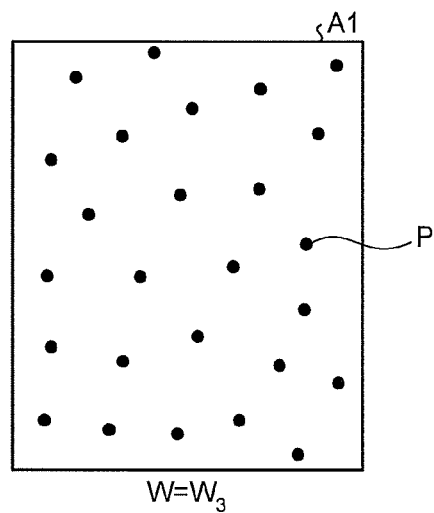

FIGS. 14A to 14C are diagrams illustrating a relationship between dispersion (distribution and concentration) of the discrete points P and the average nearest neighbor distance W in an evaluation area A1. When the discrete points P are concentrated in approximately one area in the evaluation area A1 (FIG. 14A), the average nearest neighbor distance W takes a small value ($W=W_1$). When areas where the discrete points P are concentrated are increased (FIG. 14B), the average nearest neighbor distance W is slightly increased ($W=W_2>W_1$). For example, in FIG. 14B, the discrete points P are concentrated in two areas in the evaluation area A1. The values $W_1$ and $W_2$ of the average nearest neighbor distance of this case indicate that the texture components are inhomogeneous in the distribution as illustrated in, for example, FIG. 12(b). When the discrete points P are dispersed over the whole evaluation area A1 (FIG. 14C), the average nearest neighbor distance W becomes large ($W=W_3>W_2$). The value $W_3$ of the average nearest neighbor distance of this case indicates that the texture components are homogeneous as illustrated in, for example, FIG. 11(b).

At Step S23, the identifying unit 22 determines the homogeneity of the texture components and identifies the category of the evaluation area, on the basis of the evaluation value (the average nearest neighbor distance W) calculated by the homogeneity-evaluation-value calculating unit 212. Specifically, the identifying unit 22 determines the homogeneity of the evaluation value by using an expectation value E[W] calculated by the following Equation (5) as a threshold. The expectation value E[W] indicated by Equation (5) is an expectation value based on the assumption that the discrete points P are randomly distributed in the discrete distribution data.

$$E[W] = \frac{k}{2\sqrt{\frac{n}{s}}} \qquad (5)$$

In Equation (5), k is a coefficient (constant) obtained by experimental measurement, and S is an area of the evaluation area A1.

Accordingly, the homogeneity of the texture components is determined as follows.

W<E[w]: homogeneous

W≥E[W]: inhomogeneous

Furthermore, when the texture components are homogeneous, the identifying unit 22 identifies the evaluation area as the mucosal area. On the other hand, when the texture components are not homogeneous, the identifying unit 22 identifies the evaluation area as the residue area.

As described above, according to the second embodiment, the homogeneity of the texture components and the category of the evaluation area are determined on the basis of the discrete distribution data that represents the texture components. Therefore, it is possible to reduce the total amount of calculations, enabling to obtain a determination result in shorter time.

The evaluation value based on the discrete distribution data may be calculated (Step S22) by various methods other than the method described above. In the following, examples of the other methods for calculating the evaluation value based on the discrete distribution data will be explained in the first to third modifications of the second embodiment.

First Modification of the Second Embodiment

Calculation of the Evaluation Value by K-Function Method

The K-function method is a method developed to identify a distribution that can hardly be discriminated by the nearest neighboring method. An evaluation value K(h) by the K-function method is calculated by the following Equation (6).

$$K(h) = \frac{\frac{1}{n}\sum_{i=1}^{n} K_i(h)}{\lambda} \quad (6)$$

Figure 15:
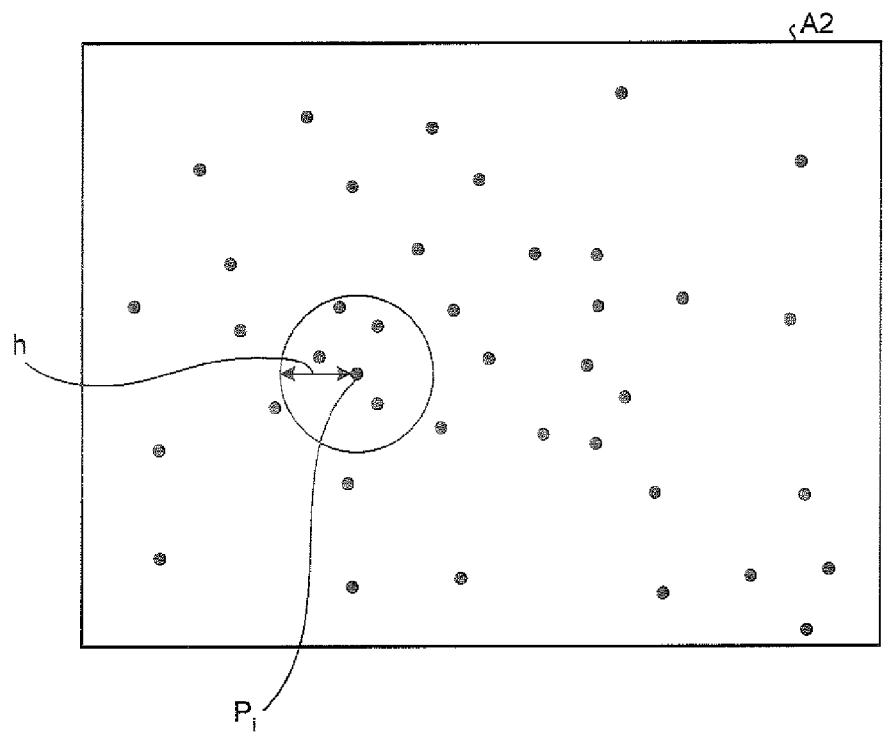
FIG. 15 is a diagram explaining a method of calculating an evaluation value by the K-function method.

In Equation (6), $k_i(h)$ indicates the number of other discrete points that are present within a range of a distance h form each of the discrete points $P_i$ constituting the discrete distribution data. For example, in the case of a certain discrete point $P_i$ indicated in an evaluation area A2 in FIG. 15, $k_i(h)$=4. $\lambda$ is a density ($\lambda$=n/S) of the discrete points P in the evaluation area A2.

When the evaluation value K(h) as above is used, the homogeneity of the texture distribution and the category of the evaluation area are determined in the following manner.

First, an expectation value E [K(h)] of the K-function is obtained by the following Equation (7).

$$E[K(h)] = \pi h^2 \quad (7)$$

Here, $\pi$ is a circular constant.

The homogeneity of the texture distribution is determined as follows by using the expectation value E [K(h)] as a threshold.

K(h)<E[K(h)]: homogeneous
K(h)≥E[K(h)]: inhomogeneous

Therefore, when the texture components are homogeneous, the evaluation area is identified as the mucosal area. On the other hand, when the texture components are not homogeneous, the evaluation area is identified as the residue area.

Second Modification of the Second Embodiment

Calculation of the Evaluation Value by $x^2$ Test

Figure 16A:
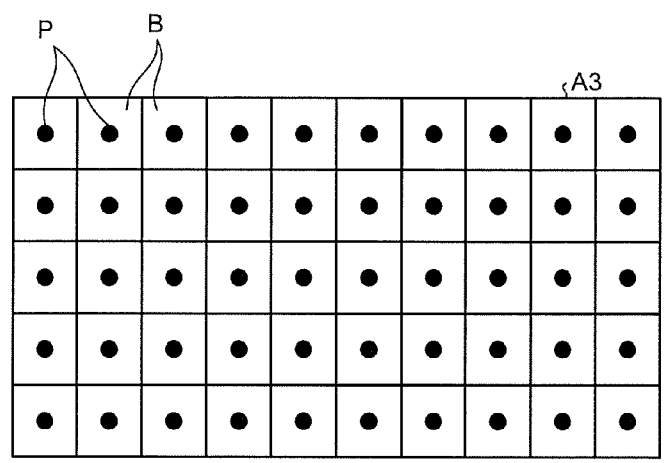
FIGS. 16A and 16B are diagrams explaining a method of calculating an evaluation value by the $x^2$ test.
Figure 16B:
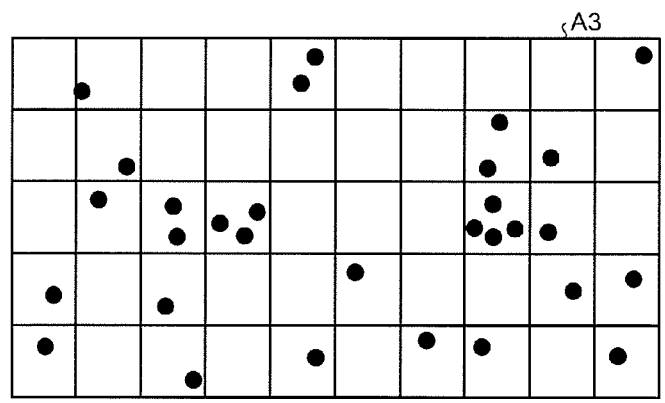

When an evaluation area A3 illustrated in FIGS. 16A and 16B is evaluated, it is assumed that the evaluation A3 is divided into a plurality of areas (e.g., rectangular areas) B each having the same shape and the same size. When it is assumed that the discrete points P are evenly distributed in the evaluation area A3, the occurrence probability of the discrete points P contained in each area B becomes constant. For example, in FIG. 16A, one discrete point P is present in each area B at the same probability. On the other hand, as illustrated in FIG. 16B, when the distribution of the discrete points P is biased, the occurrence probability of the discrete points P in each area B varies. Therefore, if the degree of deviation between the occurrence probability of the discrete points P that are assumed as being evenly distributed and the occurrence probability of the actual discrete points P is obtained, the degree of deviation can be used as the evaluation value that indicates the homogeneity of the texture components.

The $x^2$ test is a method for testing, on the assumption that the probability that a discrete point P is contained in the j-th area $B_j$ is $PR_j$, whether a theoretical value based on the probability matches with the actual distribution of n discrete points P. To determine the homogeneity of the texture components by using the $x^2$ test, $x^2$ is calculated by the following Equation (8) on the assumption that the occurrence probability PR of all of the areas B becomes such that PR=1/M (M is the number of rectangular areas C).

$$x^2 = \sum_{j=1}^{M} \frac{\left(C_j - n\left(\frac{1}{M}\right)\right)^2}{n\left(\frac{1}{M}\right)} \quad (8)$$

In Equation (8), $C^j$ is the number of discrete points P contained in the j-th area $B_j$. n is the total number of the discrete points P contained in the evaluation area A3.

$x^2$ calculated by the above Equation (8) is used as the evaluation value that indicates the homogeneity of the texture distribution That is, when $x^2$ is smaller than a predetermined value (i.e., when the degree of deviation described above is small), it is determined that the texture distribution is homogeneous. In this case, the evaluation area is identified as the mucosal area. On the other hand, when $x^2$ is equal to or greater than the predetermined value (i.e., when the degree of deviation described above is large), it is determined that the texture distribution is not homogeneous. In this case, the evaluation area is identified as the residue area.

Third Modification of the Second Embodiment

Calculation of the Evaluation Value by a Diversity Index

As illustrated in FIG. 16A, when the discrete points P are evenly distributed in the evaluation area A3, the number of the areas B containing the discrete points P is large. On the other hand, as illustrated in FIG. 16B, when the distribution of the discrete points P is biased, the number of the areas B that does not contain the discrete point B is large. Therefore, if the degree of distribution of the discrete points P to a plurality of areas B is obtained, the degree can be used as the evaluation value that indicates the homogeneity of the texture components.

As a method of calculating the degree of distribution of the discrete points P to the areas B, for example, a diversity index is used. The diversity index is an index for evaluating the abundance of a type (M) in a group (N). Specifically, the number of the areas B is used as the type (M), and the Simpson diversity index D is calculated by using the following Equation (9).

$$D = 1 - \sum_{j=1}^{M} \left(\frac{C_j}{n}\right)^2 \quad (9)$$

In Equation (9), $C_j$ is the number of discrete points P contained in the j-th area $B_j$. n is the total number of the discrete points P contained in the evaluation area A3.

When the diversity index D as above is used, the homogeneity of the texture distribution and the category of the evaluation area are determined in the following manner. That is, when the diversity index D is greater than a predetermined threshold (i.e., when the distribution of the discrete points P is diverse), it is determined that the texture distribution is homogeneous and the evaluation area is a mucosal area. On the other hand, when the diversity index D is equal to or smaller than the predetermined threshold (i.e., when the distribution of the discrete points P is biased), it is determined that the texture components are not homogeneous and the evaluation area is a residue area.

Alternatively, the Shannon index H' by the following Equation (10) may be used as the degree of distribution of the discrete points P to a plurality of areas B.

$$H' = -\sum_{j=1}^{M} \left(\frac{C_j}{n}\right) \ln\left(\frac{C_j}{n}\right) \qquad (10)$$

In this case, when the Shannon index H' is greater than a predetermined threshold, it is determined that the texture distribution is homogeneous and the evaluation area is a mucosal area. On the other hand, when the Shannon index H' is smaller than the predetermined threshold, it is determined that the texture components are inhomogeneous in the distribution and the evaluation area is a residue area.

Third Embodiment

An image processing device according to a third embodiment of the present invention will be explained below.

Figure 17:
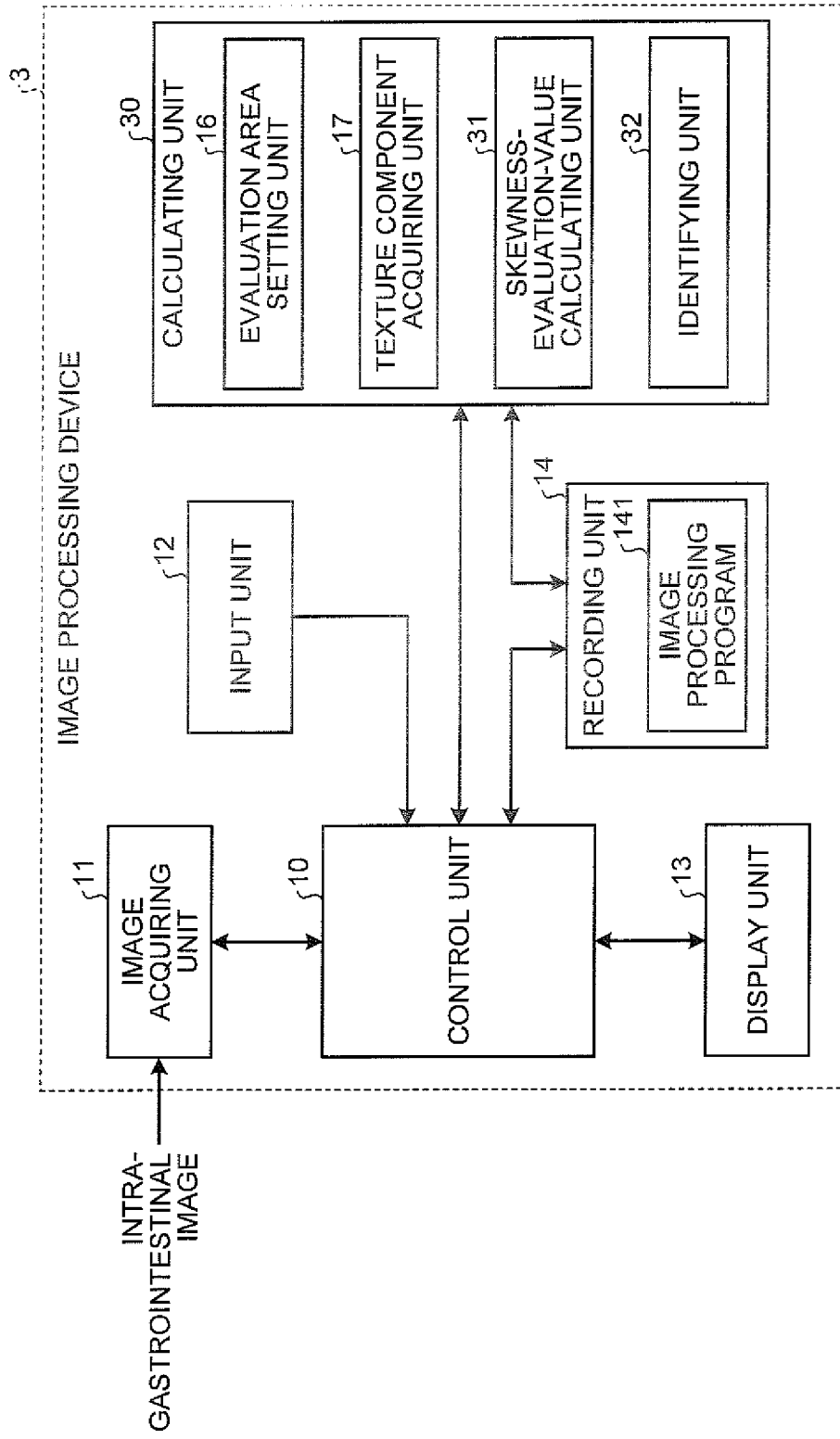
FIG. 17 is a block diagram of a configuration of an image processing device according to a third embodiment of the present invention.

FIG. 17 is a block diagram of a configuration of the image processing device according to the third embodiment. An image processing device 3 illustrated in FIG. 17 includes a calculating unit 30. The calculating unit 30 includes a skewness-evaluation-value calculating unit 31 as the evaluation value calculating means, and an identifying unit 32 that identifies a category of an evaluation area on the basis of a calculation result obtained by the skewness-evaluation-value calculating unit 31. The other configurations are the same as those illustrated in FIG. 1.

The skewness-evaluation-value calculating unit 31 obtains a frequency distribution of pixel values (intensities) of the texture components in the evaluation area, and calculates the evaluation value indicating the homogeneity of the texture components on the basis of skewness of the shape of the frequency distribution. The identifying unit 32 determines the homogeneity of the texture components on the basis of the evaluation value and identifies the evaluation area as a mucosal area or a residue area on the basis of the determination result.

Figure 18A:
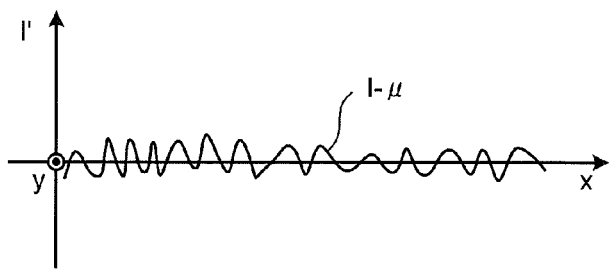
FIGS. 18A and 18B are diagrams illustrating examples of texture components in a mucosal area and a histogram of the texture components.
Figure 18B:
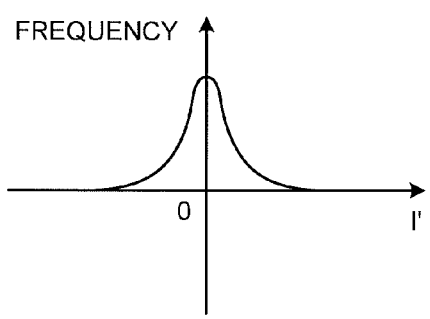
Figure 19A:
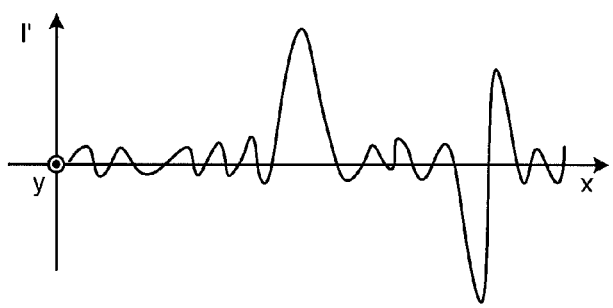
FIGS. 19A and 19B are diagrams illustrating examples of texture components in a residue area and a histogram of the texture components.
Figure 19B:
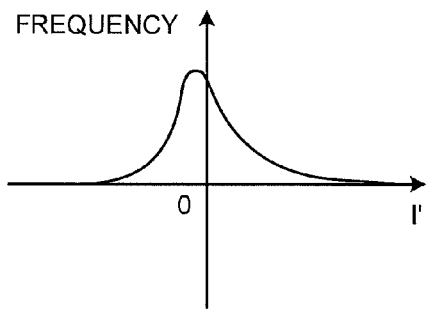

The principle of the category identification in the third embodiment will be explained below with reference to FIGS. 18A, 18B, 19A and 19B. In FIG. 18A and FIG. 19A, the horizontal axes represent the x coordinate of pixels contained in the evaluation area, and the vertical axes represent a difference I' between a pixel value I and an average μ of the pixels values in the evaluation area. In FIG. 18B and FIG. 19B, the horizontal axes represent a difference I' between the pixel value I and the average μ, and the vertical axes represent the frequency of the difference I'.

FIG. 18A illustrates the property of the texture components in the mucosal area. In the mucosal area, the pixel values of the texture components are relatively uniform. When a histogram of such texture components is generated, the histogram has a symmetrical shape with less distortion, about the average value (I'=0) as a central axis (FIG. 18B). On the other hand, FIG. 19A illustrates the property of the texture components in the residue area. In the residue area, the pixel values of the texture components largely vary. When a histogram of such texture components is generated, the histogram is distorted (FIG. 19B). Therefore, the homogeneity of the texture components can be determined by obtaining the symmetry (distortion) of the histogram of the pixel values of the texture components. Consequently, it is possible to determine whether the evaluation area is the mucosal area or the residue area on the basis of the homogeneity.

Figure 20:
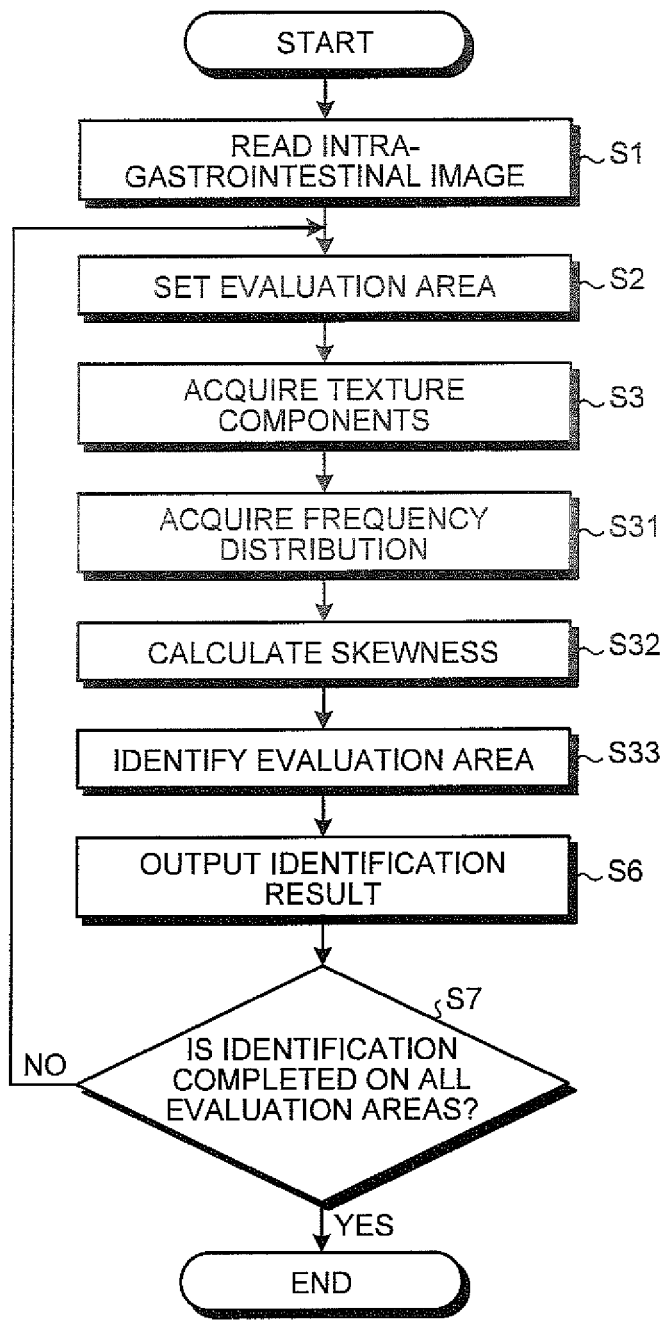
FIG. 20 is a flowchart of an operation performed by the image processing device according to the third embodiment.

The operation performed by the image processing device 3 will be explained below. FIG. 20 is a flowchart of the operation performed by the image processing device 3. The operations at Steps S1 to S3, S6, and S7 are the same as those explained in the first embodiment.

At Step S31, the skewness-evaluation-value calculating unit 31 acquires texture components from the texture component acquiring unit 17 and calculates the frequency distribution of the pixel values.

At Step S32, the skewness-evaluation-value calculating unit 31 calculates skewness Sk by using the following Equation (11), as an evaluation value that indicates the symmetry of the frequency distribution obtained at Step S31.

$$Sk = \sum_{i} \frac{(I_i - \mu)^3}{n\sigma^3} \qquad (11)$$

In Equation (11), $I_i$ is a pixel value of the i-th pixel, μ is an average of the pixel values, σ is a standard deviation of the pixel values, and n is the total frequencies of the pixel values (i.e., the number of pixels).

The skewness Sk is a value that indicates the degree of asymmetry of the distribution of data (pixel value $I_i$) with respect to the average value (the average μ). As distortion increases, the skewness Sk is more deviated from zero. When the frequency distribution is skewed such that I'<0 (e.g., the case illustrated in FIG. 19A), Sk<0. On the other hand, when the frequency distribution is skewed such that I'>0, Sk>0.

At Step S33, the identifying unit 32 determines the homogeneity of the texture components and identifies the category of the evaluation area on the basis of the evaluation value (skewness) calculated by the skewness-evaluation-value calculating unit 31. Specifically, the identifying unit 32 compares the skewness Sk calculated by Equation (11) with predetermined thresholds Thresh 1 and Thresh 2 that are acquired in advance, and determines the homogeneity of the texture components as follows.

Thresh 1<Sk<Thresh 2: homogeneous
Thresh 1≥Sk or Thresh 2≤Sk: inhomogeneous

When the texture components are homogeneous, the identifying unit 32 identifies the evaluation area as the mucosal area. On the other hand, when the texture components are not homogeneous, the identifying unit 32 identifies the evaluation area as the residue area.

As described above, according to the third embodiment, the homogeneity of the texture components and the category of the evaluation area are determined on the basis of the frequency distribution of the pixel values. Therefore, it is possible to obtain a determination result by using an algorithm that operates at a high processing speed.

The image processing devices 1 to 3 explained in the above first to the third embodiments may be implemented by causing a computer system, such as a personal computer or a workstation, to execute a program that is prepared in advance. In the following, a computer system that has the same functions as those of the image processing devices 1 to 3 and that executes the image processing program 141 stored in the recording unit 14 will be explained.

Figure 21:
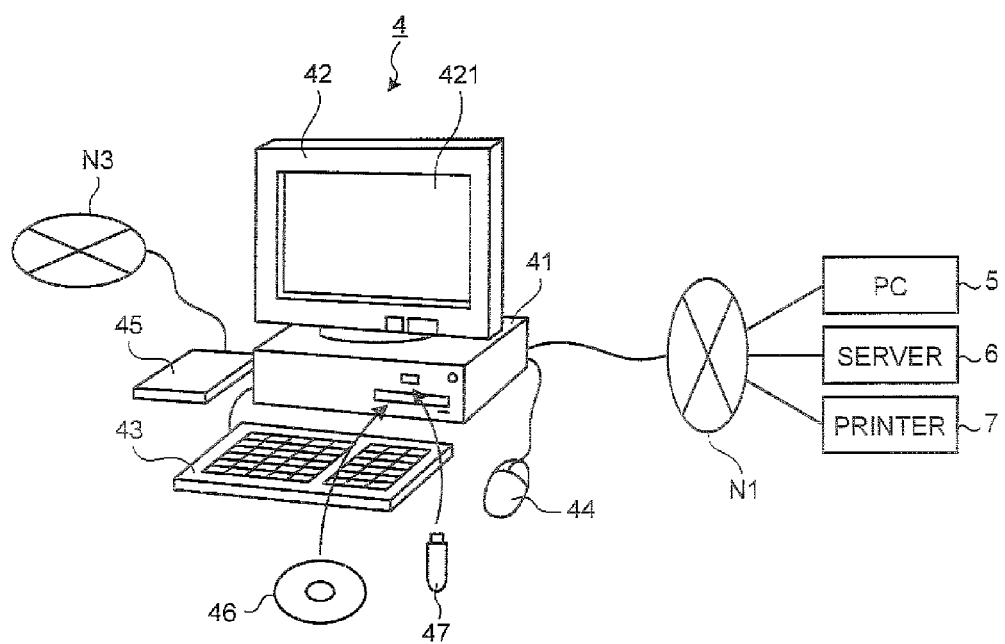
FIG. 21 is a system configuration diagram of a computer system to which the image processing device according to the first, the second, or the third embodiment is applied.
Figure 22:
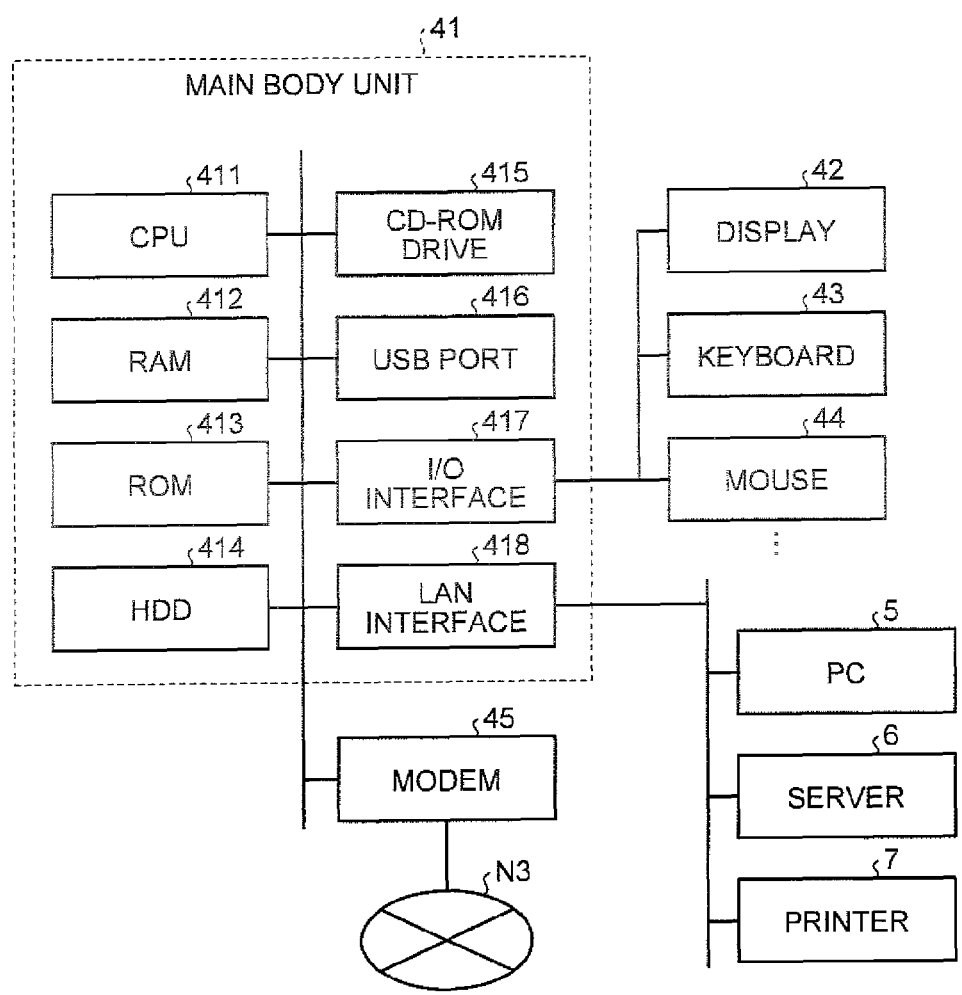
FIG. 22 is a block diagram of a configuration of a main body unit illustrated in FIG. 21.

FIG. 21 is a system configuration diagram of a computer system 4. FIG. 22 is a block diagram of a configuration of a main body unit 41 illustrated in FIG. 21. As illustrated in FIG. 21, the computer system 4 includes the main body unit 41, a display 42 for displaying information, such as an image, on a display screen 421 in accordance with an instruction of the main body unit 41, a keyboard 43 for inputting various types of information to the computer system 4, and a mouse 44 for specifying an arbitrary position on the display screen 421 of the display 42.

The main body unit 41 includes a CPU 411, a RAM 412, a ROM 413, a hard disk drive (HDD) 414, a CD-ROM drive 415 that receives a CD-ROM 46, a USB port 416 detachably connected to a USB memory 47, an I/O interface 417 for connecting the display 42, the keyboard 43 and the mouse 44, and a LAN interface 418 for connecting to a local area network or a wide area network (LAN/WAN) N1.

The computer system 4 is connected to a modem 45 for connecting to a public line N3, such as the Internet. The computer system 4 is also connected to other computers, such as a personal computer (PC) 5, a server 6, and a printer 7, via the LAN interface 418 and the local area network or the wide area network N1.

The computer system 4 reads and executes an image processing program (e.g., the image processing program 141 illustrated in FIG. 1) recorded in a recording medium, thereby realizing the image processing devices 1 to 3 described in the first to the third embodiments. Herein, apart from the CD-ROM 46 or the USB memory 47, the recording medium can be of any type in which the image processing program readable by the computer system 4 can be stored. For example, the recording medium can also be a "portable physical medium" such as an MO disk, a DVD, a flexible disk (FD), a magneto optical disk, or an IC card. Alternatively, the recording medium can also be a "fixed physical medium" such as the HDD 414, the RAM 412, or the ROM 413 that can be disposed inside or outside of the computer system 4. Still alternatively, the recording medium can also be a "communication medium", such as the public line N3 connected via the modem 45 or can be the LAN or WAN N1 to which the other computer systems such as the PC 5 and the server 6 are connected, that stores computer programs for a short period of time at the time of transmission. The image processing program is not limited to those implemented by the computer system 4. The present invention can similarly be applied to the case that the other computer systems, such as the PC5 or the server 6, executes the image processing program or the case that the other computer systems execute the image processing program in cooperation with each other.

The present invention is not limited to the first to third embodiments and modifications thereof, and various inventions can be made by appropriately combining plural components disclosed in respective embodiments and modifications. For example, an invention can be made by eliminating some components from all the components disclosed in respective embodiments and modifications, and an invention can be made by appropriately combining components disclosed in different embodiments and modifications.

According to one embodiment of the present invention, a category of an evaluation area in an in-vivo image is identified on the basis of the homogeneity of the texture components in the evaluation area of the in-vivo image. Therefore, it is possible to obtain an appropriate identification result without being influenced by the imaging conditions and by using an algorithm that operates at a high processing speed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device comprising:
   a processor; and
   a memory storing computer-readable instructions that, when executed by the processor, implement:
   an evaluation area setting unit that sets an evaluation area whose category is to be identified in an in-vivo image;
   a texture component acquiring unit that acquires texture components from the evaluation area in the in-vivo image by eliminating structural components from the evaluation area in the in-vivo image;
   an evaluation value calculating unit that calculates an evaluation value indicating homogeneity of the texture components; and
   an identifying unit that identifies the category of the evaluation area on the basis of the evaluation value;
   wherein the evaluation value calculating unit includes a biased-evaluation-value calculating unit that calculates an evaluation value indicating homogeneity of texture components in a coordinate space, and
   the in-vivo image is an intra-gastrointestinal image.

2. The image processing device according to claim 1, wherein
   the identifying unit identifies the category of the evaluation area as a mucosal area when the evaluation value is in a predetermined range indicating that the texture components are homogeneous.

3. The image processing device according to claim 1, wherein
   the biased-evaluation-value calculating unit calculates a distance between a coordinate centroid of the evaluation area and a weighted coordinate centroid that is obtained by weighting each pixel contained in the evaluation area by a pixel value of a corresponding texture component.

4. The image processing device according to claim 3, wherein
   the biased-evaluation-value calculating unit calculates the weighted coordinate centroid by weighting part of the pixels contained in the evaluation area by pixel values of respective texture components.

5. The image processing device according to claim 4, wherein
   the biased-evaluation-value calculating unit calculates the weighted coordinate centroid by weighting a pixel whose pixel value is a predetermined percent of a maximum value of the pixel values of the texture components.

6. The image processing device according to claim 1,
   wherein the biased-evaluation-value calculating unit includes a discrete distribution calculating unit that calculates a discrete distribution data composed of a plurality of discrete points, on the basis of the texture components that are represented as a continuous distribution; and wherein the computer-readable instructions, when executed by the processor, further implement a homogeneity-evaluation-value calculating unit that calculates the evaluation value on the basis of coordinate information of the discrete points.

7. The image processing device according to claim 6, wherein the discrete distribution calculating unit extracts, as the discrete points, pixels whose pixel values are a predetermined percent of the maximum value of the pixel values of the texture components.

8. The image processing device according to claim 6, wherein the homogeneity-evaluation-value calculating unit calculates the evaluation value by analyzing a distribution of the discrete points on the basis of distances between the discrete points.

9. The image processing device according to claim 8, wherein the homogeneity-evaluation-value calculating unit calculates the evaluation value by using a distance between each of the discrete points and a nearest neighbor discrete point of each of the discrete points.

10. The image processing device according to claim 8, wherein the homogeneity-evaluation-value calculating unit calculates the evaluation value on the basis of each of the discrete points and the number of discrete points that are present within a range of a predetermined distance from each of the discrete points.

11. The image processing device according to claim 6, wherein the homogeneity-evaluation-value calculating unit divides the evaluation area into areas having the same shape and the same size and calculates the evaluation value on the basis of the number of discrete points contained in each of the areas.

12. The image processing device according to claim 11, wherein the homogeneity-evaluation-value calculating unit calculates the evaluation value by using a chi-squared test.

13. The image processing device according to claim 11, wherein the homogeneity-evaluation-value calculating unit calculates the evaluation value by using a diversity index that indicates diversity of types contained in a group.

14. The image processing device according to claim 1, wherein the evaluation value calculating unit calculates the evaluation value on the basis of skewness of a frequency distribution of the pixel values of the texture components.

15. An image processing method comprising:

setting an evaluation area whose category is to be identified in an in-vivo image;

acquiring texture components from the evaluation area in the in-vivo image by eliminating structural components from the evaluation area in the in-vivo image;

calculating an evaluation value indicating homogeneity of the texture components; and identifying the category of the evaluation area on the basis of the evaluation value;

wherein the calculating an evaluation value includes calculating an evaluation value indicating homogeneity of texture components in a coordinate space, and the in-vivo image is an intra-gastrointestinal image.

16. A computer-readable recording device with an executable program stored thereon, wherein the program instructs a processor to perform:

setting an evaluation area whose category is to be identified in an in-vivo image;

acquiring texture components from the evaluation area in the in-vivo image by eliminating structural components from the evaluation area in the in-vivo image;

calculating an evaluation value indicating homogeneity of the texture components; and identifying the category of the evaluation area on the basis of the evaluation value;

wherein the calculating an evaluation value includes calculating an evaluation value indicating homogeneity of texture components in a coordinate space, and the in-vivo image is an intra-gastrointestinal image.

17. The image processing device according to claim 2, wherein the identifying unit identifies the category of the evaluation area as a residue area when the evaluation value is in a predetermined range indicating that the texture components are not homogeneous.

18. An image processing device comprising:

an evaluation area setting unit that sets an evaluation area whose category is to be identified in an in-vivo image;

a texture component acquiring unit that acquires texture components from the evaluation area in the in-vivo image by eliminating structural components from the evaluation area in the in-vivo image;

an evaluation value calculating unit that calculates an evaluation value indicating homogeneity of the texture components; and an identifying unit that identifies the category of the evaluation area on the basis of the evaluation value;

wherein the evaluation value calculating unit includes a biased-evaluation-value calculating unit that calculates an evaluation value indicating homogeneity of texture components in a coordinate space, and the in-vivo image is an intra-gastrointestinal image.

\* \* \* \* \*